US012738973B2

(12) United States Patent
Lugitsch et al.

(10) Patent No.: US 12,738,973 B2
(45) Date of Patent: Sep. 15, 2026

(54) RECEIVER AND METHOD OF OPERATING A RECEIVER

(71) Applicant: NXP B.V., Eindhoven (NL)

(72) Inventors: David Lugitsch, Graz (AT); Stefan Tertinek, Graz (AT)

(73) Assignee: NXP B.V., Eindhoven (NL)

( * ) Notice: Subject to any disclaimer, the term of this patent is extended or adjusted under 35 U.S.C. 154(b) by 79 days.

(21) Appl. No.: 19/041,856

(22) Filed: Jan. 30, 2025

(65) Prior Publication Data

US 2025/0253887 A1 Aug. 7, 2025

(30) Foreign Application Priority Data

Feb. 2, 2024 (EP) .................................... 24155546

(51) Int. Cl.
*H04B 1/7163* (2011.01)
*H04W 56/00* (2009.01)

(52) U.S. Cl.
CPC ...... *H04B 1/7163* (2013.01); *H04W 56/0035* (2013.01)

(58) Field of Classification Search
CPC ............... H04B 1/7163; H04B 1/7183; H04W 56/0035; H04W 56/005; H04W 56/0015; G01S 7/006; G01S 13/106; G01S 13/0209
See application file for complete search history.

(56) References Cited

U.S. PATENT DOCUMENTS

| | | | |
|---|---|---|---|
| 7,873,099 B2 | 1/2011 | Fullerton et al. | |
| 9,791,550 B2 | 10/2017 | McKitternick et al. | |
| 11,057,862 B2 | 7/2021 | Scharf et al. | |
| 11,711,254 B2 | 7/2023 | Moghaddam et al. | |
| 2011/0193739 A1 | 8/2011 | Strauch et al. | |
| 2015/0372715 A1* | 12/2015 | Dehmas ............... | H04B 1/7183 375/140 |
| 2023/0088441 A1 | 3/2023 | Tertinek et al. | |
| 2023/0142169 A1 | 5/2023 | Lugitsch et al. | |
| 2024/0196348 A1* | 6/2024 | Chen .................. | H04B 7/18513 |
| 2024/0201361 A1 | 6/2024 | Schober et al. | |

OTHER PUBLICATIONS

Wen Fan et al; “Robust, Low-Complexity, and Energy Efficient Downlink Baseband Receiver Design for MB-OFDM UWB System”; IEEE Trans On circuits and Systems I: Regular Papers, vol. 59, No. 2; IEEE, US; pp. 399-408 (Feb. 1, 2012).

(Continued)

*Primary Examiner* — Sung S Ahn

(57) ABSTRACT

A receiver includes an ultra-wideband, UWB, communication unit configured to operate in a radar mode and to receive a synchronization signal transmitted by a transmitter, and a synchronization unit operatively coupled to the UWB communication unit. The synchronization unit is configured to estimate a carrier frequency offset from the synchronization signal, derive a reference time from the synchronization signal, and derive a time window for the reception of a radar packet by the UWB communication unit. The time window is derived from the estimated carrier frequency offset and the reference time. A corresponding method of operating a receiver also is disclosed.

20 Claims, 3 Drawing Sheets

(56) References Cited

OTHER PUBLICATIONS

Xiliang Luo, et al. "Project: IEEE P802.15 Working Group for WPANs, NBA-UWB Technical Framework," DCN: 15-23-0100-02-04ab; pp. 1-15; Mar. 2023.
Leong, Frank et al; "IEEE P802.15 Working Group for Wireless Personal area Networks (WPANs)—Frequency Stitiching Considerations"; 9 Pages (Mar. 2023).
Pakrooh, Pooria et al; "IEEE P802.15 Working Group for Wireless Personal Area Networks (WPANs)—Latest Consensus on UWB Sensing PHY and MAC"; 32 pages (Jul. 17, 2023).
Peng, Xiaohui et al; "IEEE P802.15, Wireless Personal Area Networks-UWB Sensing Technical Framework Proposal"; 22 pages (Jul. 2023).

* cited by examiner

RECEIVER AND METHOD OF OPERATING A RECEIVER

CROSS-REFERENCE TO RELATED APPLICATIONS

This application claims priority under 35 U.S.C. § 119 to European patent application no. 24155546.5, filed Feb. 2, 2024, the contents of which are incorporated by reference herein.

TECHNICAL FIELD

The present disclosure relates to a receiver. Furthermore, the present disclosure relates to a corresponding method of operating a receiver.

BACKGROUND

Ultra-wideband (UWB) communication technology is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e. for determining the distance between communicating devices. In addition, UWB technology may be used for radar operations. Therefore, UWB technology may be used to advantage in various applications, such as automotive applications.

SUMMARY

In accordance with a first aspect of the present disclosure, a receiver is provided, comprising: an ultra-wideband, UWB, communication unit configured to operate in a radar mode and to receive a synchronization signal transmitted by a transmitter; a synchronization unit operatively coupled to the UWB communication unit, wherein said synchronization unit is configured to: estimate a carrier frequency offset from the synchronization signal; derive a reference time from the synchronization signal; derive a time window for the reception of a radar packet by the UWB communication unit, wherein the time window is derived from the estimated carrier frequency offset and the reference time.

In one or more embodiments, the synchronization unit is configured to estimate the carrier frequency offset using data in a SYNC field included in the synchronization signal.

In one or more embodiments, the synchronization unit is configured to derive the reference time from a start-of-frame delimiter (SFD) field included in the synchronization signal.

In one or more embodiments, the synchronization unit is configured to derive the reference time from an output of one or more ranging operations performed between the UWB communication unit and the transmitter.

In one or more embodiments, the time window is defined by a number of clock increments, and the synchronization unit is configured to correct said number of clock increments using the estimated carrier frequency offset.

In one or more embodiments, the synchronization unit is configured to correct said number of clock increments by adding an amount c to the number of clock increments, wherein the amount c is calculated as follows:

$$c = CFO \cdot \frac{T}{f_c},$$

wherein CFO represents the estimated carrier frequency offset, T represents a jointly defined time window in clock increments, and $f_c$ represents the carrier frequency.

In one or more embodiments, the jointly defined time window is a transmission window applied by the transmitter.

In one or more embodiments, the start of the time window is based on the reference time.

In one or more embodiments, the synchronization signal is a first radar packet of a block of radar packets, wherein said first packet contains a SYNC field and an SFD field.

In one or more embodiments, the block of radar packets comprises one or more further radar packets, wherein said further radar packets contain only a SYNC field.

In one or more embodiments, the receiver further comprises an interface unit for receiving a wired or wireless signal, wherein the synchronization unit is operatively coupled to the interface unit and further configured to time the reception of the synchronization signal based on the wired or wireless signal.

In one or more embodiments, the synchronization unit is configured to estimate the carrier frequency offset, derive the reference time and derive the time window in a periodical manner.

In one or more embodiments, a radar system comprises a receiver of the kind set forth and a transmitter, wherein said transmitter comprises a UWB communication unit configured to operate in a radar mode and to transmit a synchronization signal to said receiver.

In one or more embodiments, the transmitter further comprises an interface unit for receiving a wired or wireless signal, wherein the transmitter is configured to time the transmission of a radar block based on the wired or wireless signal.

In accordance with a second aspect of the present disclosure, a method of operating a receiver is conceived, comprising: receiving, by an ultra-wideband, UWB, communication unit included in said receiver, a synchronization signal transmitted by a transmitter; estimating, by a synchronization unit included in said receiver, a carrier frequency offset from the synchronization signal; deriving, by the synchronization unit, a reference time from the synchronization signal; deriving, by the synchronization unit, a time window for the reception of a radar packet by the UWB communication unit, wherein the time window is derived from the estimated carrier frequency offset and the reference time.

DESCRIPTION OF DRAWINGS

Embodiments will be described in more detail with reference to the appended drawings.

DESCRIPTION OF EMBODIMENTS

UWB communication devices may operate in a radar mode with the purpose of detecting objects that reflect the radar signals transmitted by said devices. Such objects are often referred to as "targets". In a UWB radar network, multiple devices (i.e., nodes) may be employed to create a map of static and dynamic targets (i.e., reflectors). As these nodes are spatially separated, no physical connection between them is desired. All devices in the radar network typically use independent oscillators as a clock or time reference. These devices sense the environment by transmitting and receiving a block of radar packets, each packet having a fixed time interval. For example, in a child-presence detection (CPD) use case a typical packet interval has a length of 100 milliseconds.

Since all devices have an independent time reference, this may lead to an uncertainty in the time of transmission or reception for each radar packet in the sensing block. This uncertainty depends on the carrier frequency offset (CFO) and the packet interval and lies typically in the range of 100 nanoseconds to several microseconds. This uncertainty may cause that static targets in each radar packet are shifted, making them perceived as moving. Thus, the distance information obtained from the channel impulse response (CIR) index of a radar packet may become useless. In addition, the transmit packets may slowly drift out of the receiver window, thereby reducing the received energy.

Figure 1:
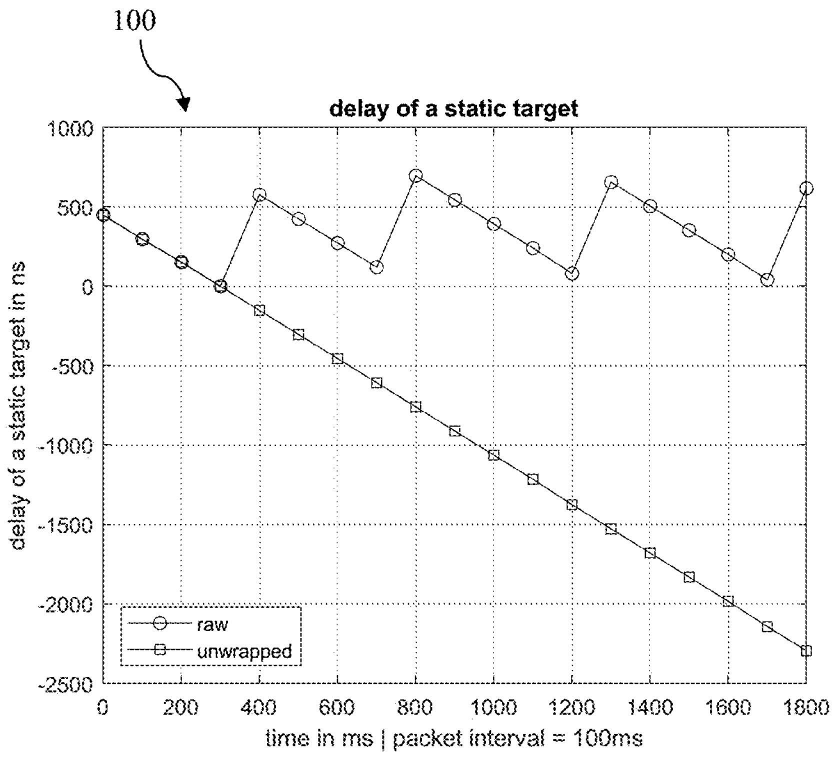
FIG. 1 shows a measured delay of a static target.

FIG. 1 shows a measured delay of a static target 100. More specifically, the measured delay of a static target for 19 radar packets is shown. In a perfectly synchronized case, the delay is identical for each radar packet. In an unsynchronized case, the packet interval at the receiving device is not the same as the packet interval at the transmitting device. This leads to an apparent movement of the target as can be seen in FIG. 1. In a pulsed radar system, the obtained distance wraps with the unambiguous distance defined by the pulse respectively symbol duration. FIG. 1 also shows the unwrapped delay. In free space the distance can be obtained by multiplying the delay by the speed of light.

Now discussed are a receiver and a corresponding method of operating a receiver, which facilitate reducing the likelihood of errors in object detection and distance estimations in UWB-based radar systems.

Figure 2:
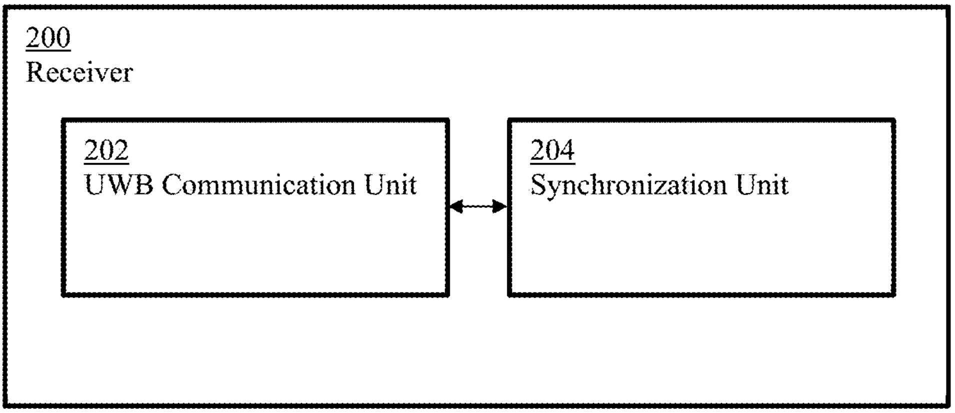
FIG. 2 shows an illustrative embodiment of a receiver.

FIG. 2 shows an illustrative embodiment of a receiver 200. The receiver 200 comprises a UWB communication unit 202 configured to operate in a radar mode and to receive a synchronization signal transmitted by a transmitter (not shown). Furthermore, the receiver 200 comprises a synchronization unit 204 which is operatively coupled to the UWB communication unit 202. The synchronization unit 204 is configured to estimate a carrier frequency offset from the synchronization signal. Furthermore, the synchronization unit 204 is configured to derive a reference time from the synchronization signal. Specifically, the reference time is a point or an instance in time, which can be used as a reference. In addition, the synchronization unit 204 is configured to derive a time window for the reception of a radar packet by the UWB communication unit, wherein the time window is derived from the estimated carrier frequency offset and the reference time. By deriving a time window for the reception of a radar packet in this manner, a drift between the time stamps of the transmitter and the receiver—which may be caused by the carrier frequency offset between the transmitter and receiver—may be corrected. This, in turn, facilitates reducing the likelihood of errors in object detection and distance estimations in UWB-based radar systems.

In one or more embodiments, the synchronization unit is configured to estimate the carrier frequency offset using data in a SYNC field included in the synchronization signal. In this way, the carrier frequency offset may easily be estimated, using a common format of UWB signals. More specifically, the carrier frequency offset may be estimated (i.e., calculated) based on a phase discriminator which determines the phase difference (which is proportional to the frequency offset) between two consecutive correlation peaks computed from the SYNC field data. Accordingly, the strongest signal component (i.e., correlation peak) may be used to estimate the carrier frequency offset. This signal component is not necessarily the line-of-sight component and may include Doppler shifts caused by targets. It is noted that US 2023/142169 A1 describes a method to estimate the carrier frequency offset only caused by the clock differences of the devices, which may result in a more reliable carrier frequency offset estimate for radar applications.

In one or more embodiments, the synchronization unit is configured to derive the reference time from a start-of-frame delimiter (SFD) field included in the synchronization signal. In this way, a reference time may easily be established, using a common format of UWB signals. The SYNC and SFD fields may be defined in accordance with the IEEE 802.15.4a and IEEE 802.15.4z standards. In one or more embodiments, the synchronization unit is configured to derive the reference time from an output of one or more ranging operations performed between the UWB communication unit and the transmitter. This may result in a practical alternative way to establish the reference time.

In one or more embodiments, the time window is defined by a number of clock increments (i.e., clock ticks), and the synchronization unit is configured to correct said number of clock increments using the estimated carrier frequency offset. In this way, the drift between the time stamps of the transmitter and the receiver may easily be corrected. In a practical implementation, the synchronization unit is configured to correct said number of clock increments by adding an amount c to the number of clock increments, wherein the amount c is calculated as shown in equation (1). In this equation, CFO represents the estimated carrier frequency offset (in Hertz), T represents a jointly defined time window (in clock increments), and $f_c$ represents the carrier frequency (in Hertz).

$$c = CFO \cdot \frac{T}{f_c} \quad \text{(equation 1)}$$

In a practical implementation, the jointly defined time window is a transmission window applied by the transmitter. Furthermore, in a practical implementation, the start of the time window is based on the reference time.

In one or more embodiments, the synchronization signal is a first radar packet of a block of radar packets, wherein said first packet contains a SYNC field and an SFD field. This results in a practical implementation, in which a radar packet having a common format is used as a synchronization signal. In one or more embodiments, the block of radar packets comprises one or more further radar packets, wherein said further radar packets contain only a SYNC field. In this way, airtime and energy may be saved.

In one or more embodiments, the receiver further comprises an interface unit for receiving a wired or wireless signal, wherein the synchronization unit is operatively coupled to the interface unit and further configured to time the reception of the synchronization signal based on the wired or wireless signal. In this way, it may be prevented that the receiver should remain active to listen for the synchronization signal. This, in turn, may reduce the power consumption of the receiver. Furthermore, in one or more embodiments, the synchronization unit is configured to estimate the carrier frequency offset, derive the reference time and derive the time window in a periodical manner. In this way, the drift between the time stamps of the transmitter and the receiver may repeatedly be corrected, which further facilitates reducing the likelihood of errors in object detection and distance estimations in UWB-based radar systems. For example, the synchronization unit may perform the mentioned steps for any received radar packet, or for a predefined subset of radar packets in a block.

In one or more embodiments, a radar system comprises a receiver of the kind set forth and a transmitter, wherein said transmitter comprises a UWB communication unit configured to operate in a radar mode and to transmit a synchronization signal to said receiver. Thereby, a radar system is provided, in which the likelihood of errors in object detection and distance estimations may be reduced. In one or more embodiments, the transmitter further comprises an interface unit for receiving a wired or wireless signal, and wherein the transmitter is configured to time the transmission of a radar block based on the wired or wireless signal. In this way, the start of the transmission of the radar block may easily be timed.

Figure 3:
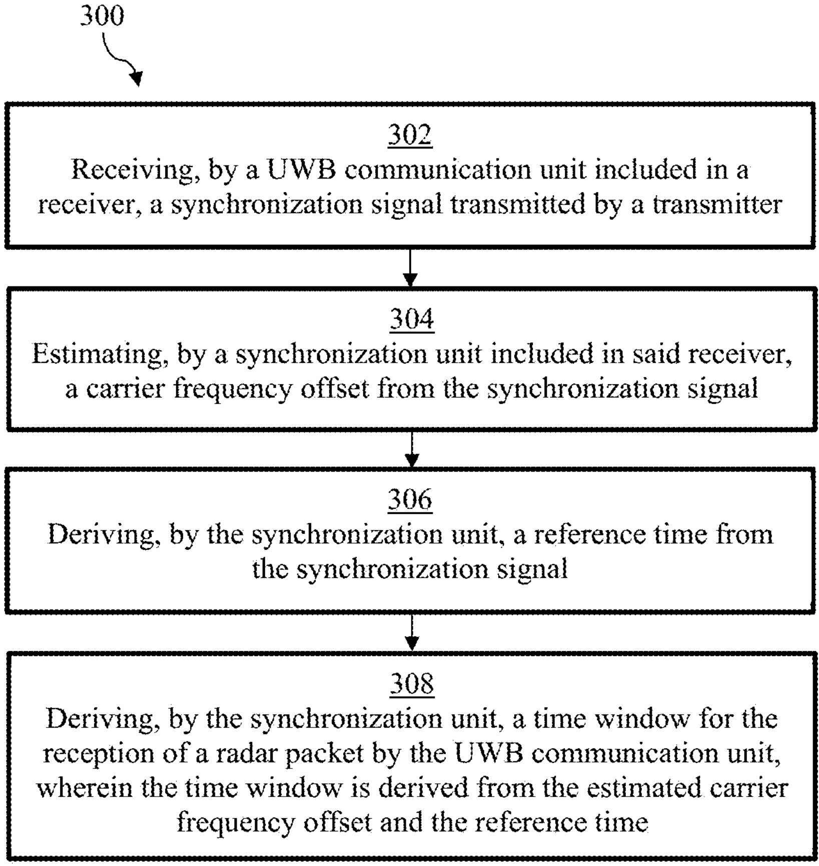
FIG. 3 shows an illustrative embodiment of a method of operating a receiver.

FIG. 3 shows an illustrative embodiment of a method of operating a receiver 300. The method 300 comprises the following steps. At 302, a UWB communication unit included in the receiver receives a synchronization signal transmitted by a transmitter. At 304, a synchronization unit included in said receiver estimates a carrier frequency offset from the synchronization signal. Furthermore, at 306, the synchronization unit derives a reference time from the synchronization signal. Furthermore, at 308, the synchronization unit derives a time window for the reception of a radar packet by the UWB communication unit, wherein the time window is derived from the estimated carrier frequency offset and the reference time. As explained with reference to the corresponding receiver shown in FIG. 2, the method 300 facilitates reducing the likelihood of errors in object detection and distance estimations in UWB-based radar systems.

A pulsed radar device (e.g., a UWB-based radar device) cyclically transmits multiple radar packets with a defined packet interval. In general, the duration of a radar packet can be shorter than the packet interval. This may lead to a pause between the packets. Each radar packet consists of multiple symbols and one symbol consists of multiple pulses. The receiving radar device calculates a CIR for each received radar packet. In accordance with the present disclosure, the receiving device may correct its receive window (i.e., the time window for the reception of a radar packet) in time, such that this receive window overlaps with the transmission time window.

In a practical implementation, a transmitter may transmit a block of radar packets with a predefined packet interval, e.g. 100 milliseconds. In that case, the first packet in the block may contain at least a SYNC field and an SFD field. The subsequent packets of the block may contain only a SYNC field. The receiver may listen for the transmitted signal and may start receiving as soon as the transmitted signal is detected. Then, the receiver may use a timestamp indicative of the reception time of the SFD field as a reference time, and estimate the CFO based on the SYNC field. Subsequently, the receiver may calculate the number of clock ticks required to wait for the next radar packet based on said timestamp and the estimated CFO.

Figure 4:
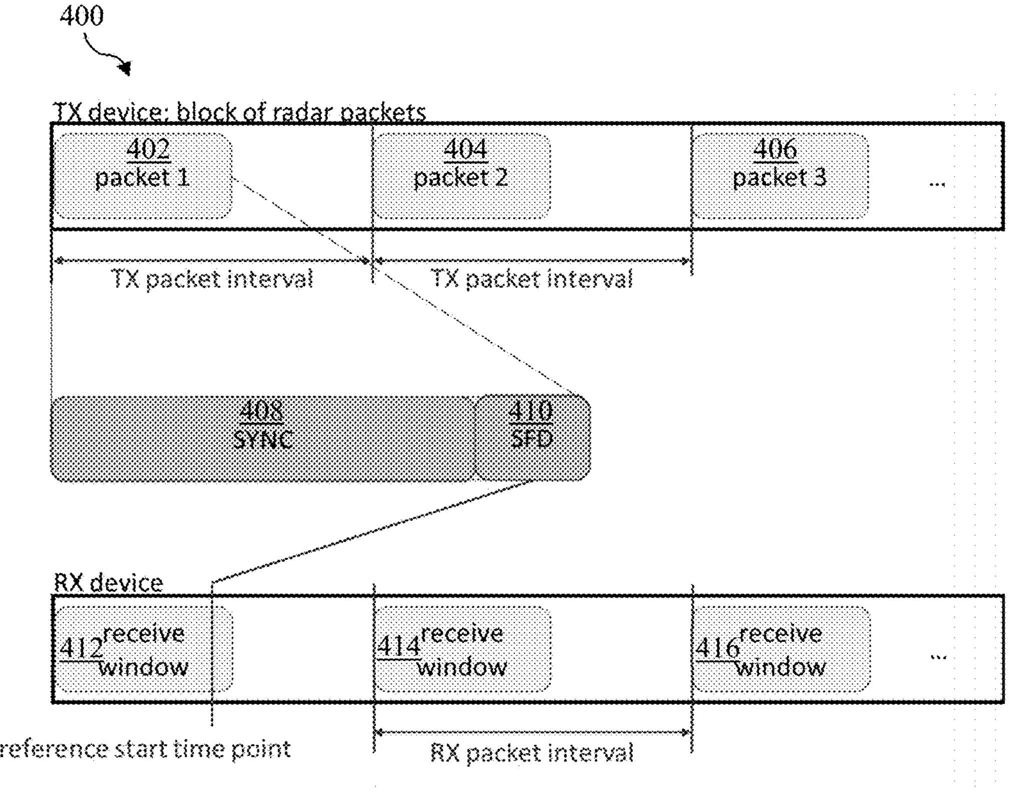
FIG. 4 shows a time course of transmitted and received radar packets.

FIG. 4 shows a time course 400 of transmitted and received radar packets. The transmitting (TX) device transmits multiple radar packets 402, 404, 406 at the TX packet interval. The packet interval may be expressed as a certain number of clock ticks. In general, this number of clock ticks is different for the TX device and receiving (RX) device. The first transmitted radar packet 402 contains a SYNC field 408 and an SFD field 410. The subsequent radar packets 404, 406 contain only the SYNC field to save airtime and energy. The RX device listens for the first radar packet 402 and starts receiving as soon as a signal is detected. The data in the SYNC field 408 is used to estimate the CFO with respect to the TX device. The SFD is used to generate a reference timestamp. Both the reference timestamp and the estimated CFO are used to calculate a number of clock ticks used to correct the initial number of clock ticks to finally get the same RX packet interval as the TX packet interval. Equation 1 defines the number of clock ticks by which the RX device needs to correct its RX packet interval to be equal to the TX packet interval. This is shown in equations 2 and 3, in which T represents a jointly defined packet interval in clock ticks, $T_{Tx}$ represents the packet interval applied by the TX device in clock ticks, and $T_{Rx}$ represents the packet interval of the RX device in clock ticks. After the correction, the packet interval applied by the RX device and the packet interval applied by the TX device are equal, but both may still be shifted in time against each other. Therefore, the RX device may calculate the next receive start (i.e., the start of the next packet interval) using the reference timestamp.

$$T_{TX} = T \quad \text{(equation 2)}$$

$$T_{RX} = T + c \quad \text{(equation 3)}$$

It is noted that the carrier frequency offset compresses or stretches the time axis on the RX side relative to the TX side, depending on whether the carrier frequency offset is positive or negative, respectively. Looking at FIG. 4, this implies that in principle two time windows should be corrected, i.e. the RX packet interval and the receive window. In other words, both the RX packet interval and the receive window may be regarded as a time window of the kind set forth above. Once these time windows are corrected the receive windows will have the same duration as the corresponding transmission windows, but they may still be shifted relative to each other in time. To compensate for this shift, the starting point of the second receive window 414 may be based on the reference point. In some implementations, the receive window does not need to be corrected. Thus, in such implementations, only the RX packet interval should be corrected, as shown in equation 3.

Figure 5:
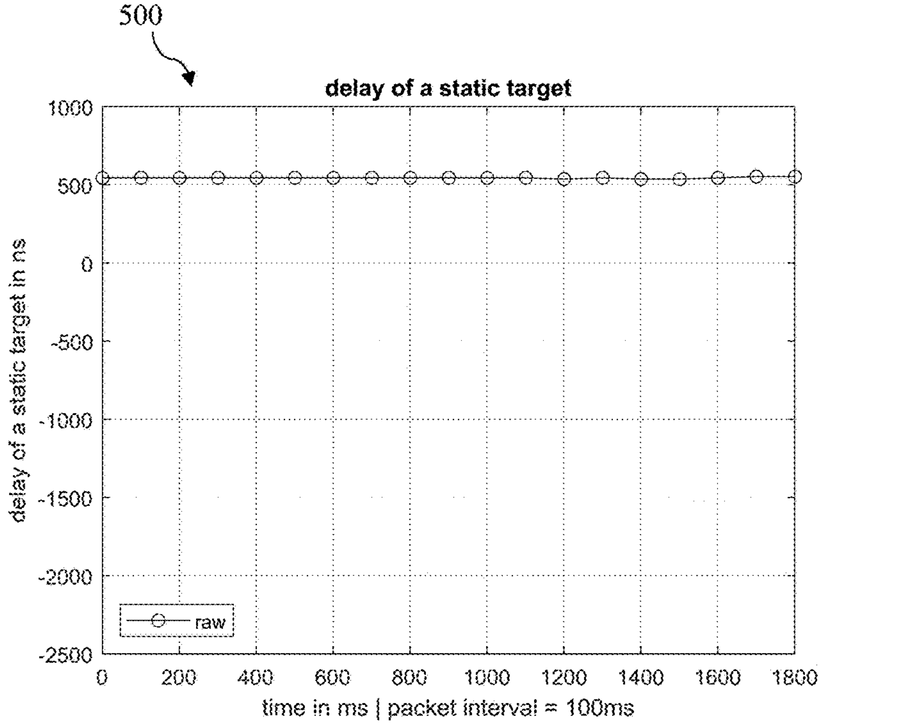
FIG. 5 shows another measured delay of a static target.

FIG. 5 shows another measured delay 500 of a static target. More specifically, the measured delay of a static target for 19 radar packets is shown, for an implementation of the presently disclosed receiver (i.e., the above-mentioned RX device). Since the packet interval of the RX device is synchronized with respect to the TX device, the target appears at the same position. Thus, the likelihood of errors in object detection and distance estimations is reduced. It is noted that the measurement was performed with two UWB devices, each with an individual clock source and a jointly defined frame interval of 100 milliseconds.

The transmission start of a radar block (i.e., an arrangement of multiple radar packets) may be triggered by an external, wired or wireless signal. This signal does not need to have a high accuracy. For example, the transmitter may receive the signal through a controller area network (CAN) bus, a Bluetooth low energy (BLE) communication unit, a UWB message authentication code (MAC) layer, or an out-of-band communication channel. Similarly, the receive start for the first radar packet in a radar block may be triggered by an external, wired or wireless signal. This may prevent the RX device to stay active in order to listen for a signal. Again, the receiver may receive the signal through a controller area network (CAN) bus, a Bluetooth low energy (BLE) communication unit, a UWB message authentication code (MAC) layer, or an out-of-band communication channel.

As mentioned above, the SFD field defined in the IEEE 802.15.4a and 802.15.4z UWB standards may be used to generate the reference time. However, any other delimiter format may be used to generate a reference time. Furthermore, a ranging sequence between the transmitting and receiving device may be used to generate the reference time. In this case, a communication in both directions (i.e., from the TX device to the RX device, and vice versa) is required for the reference time determination. For this purpose, the UWB communication units of the TX device and RX device may be configured to operate in a ranging mode, in addition to the radar mode.

Generally speaking, in a radar mode of operation, frames are transmitted by at least one device and those frames are received by the same device and/or by one or more other devices. Then, channel impulse responses (CIRs) are estimated on the device or devices receiving the frames, and the range and/or velocity and/or angle-of-arrival (AoA) are calculated based on the estimated CIRs. A radar mode of operation may be used to advantage to detect (i.e., sense) the presence of objects or human beings. In contrast, in a ranging mode of operation, frames will typically be exchanged between two devices via at least one antenna on each device, and at least a single-sided two-way ranging (SS-TWR) operation or double-sided two-way ranging (DS-TWR) operation will be carried out. In particular, CIRs are estimated on both devices, timestamps will be generated based on the CIRs on both devices, and those timestamps are exchanged. These timestamps form the basis for calculating a distance between the two devices.

It is noted that multiple instances of the presently disclosed receiver may be integrated into a radar system. Thus, a radar system may contain one TX device and multiple RX devices of the kind set forth above. Furthermore, the device role (i.e., transmitter or receiver) may be changed for any new radar block. Furthermore, the CFO estimation may be based only on a configured path between the TX device and the RX device. Finally, the CFO estimate as well as the RX packet interval may be refreshed or updated in a periodical manner, for example for any received radar packet or only for a limited number of received radar packets.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE NUMBERS

100 measured delay of a static target
200 receiver
202 UWB communication unit
204 synchronization unit
300 method of operating a receiver
302 receiving, by a UWB communication unit included in a receiver, a synchronization signal transmitted by a transmitter
304 estimating, by a synchronization unit included in said receiver, a carrier frequency offset from the synchronization signal
306 deriving, by the synchronization unit, a reference time from the synchronization signal
308 deriving, by the synchronization unit, a time window for the reception of a radar packet by the UWB communication unit, wherein the time window is derived from the estimated carrier frequency offset and the reference time
400 time course of transmitted and received radar packets
402 first packet
404 second packet
406 third packet
408 SYNC field

410 SFD field
412 receive window
414 receive window
416 receive window
500 measured delay of a static target

The invention claimed is:

1. A receiver, comprising:

an ultra-wideband, UWB, communication unit configured to operate in a radar mode and to receive a synchronization signal transmitted by a transmitter;

a synchronization unit operatively coupled to the UWB communication unit, wherein the synchronization unit is configured to:

estimate a carrier frequency offset from the synchronization signal;

derive a reference time from the synchronization signal;

derive a time window for the reception of a radar packet by the UWB communication unit, wherein the time window is derived from the estimated carrier frequency offset and the reference time.

2. The receiver of claim 1, wherein the synchronization unit is configured to estimate the carrier frequency offset using data in a SYNC field included in the synchronization signal.

3. The receiver of claim 1, wherein the synchronization unit is configured to derive the reference time from a start-of-frame delimiter, SFD, field included in the synchronization signal.

4. The receiver of claim 1 wherein the synchronization unit is configured to derive the reference time from an output of one or more ranging operations performed between the UWB communication unit and the transmitter.

5. The receiver of claim 1, wherein the time window is defined by a number of clock increments, and wherein the synchronization unit is configured to correct the number of clock increments using the estimated carrier frequency offset.

6. The receiver of claim 5, wherein the synchronization unit is configured to correct the number of clock increments by adding an amount c to the number of clock increments, wherein the amount c is calculated as follows:

$$c = CFO \cdot \frac{T}{f_c},$$

wherein CFO represents the estimated carrier frequency offset, T represents a jointly defined time window in clock increments, and $f_c$ represents the carrier frequency.

7. The receiver of claim 6, wherein the jointly defined time window is a transmission window applied by the transmitter.

8. The receiver of claim 1, wherein the start of the time window is based on the reference time.

9. The receiver of claim 1, wherein the synchronization signal is a first radar packet of a block of radar packets, wherein the first packet contains a SYNC field and an SFD field.

10. The receiver of claim 9, wherein the block of radar packets comprises one or more further radar packets, wherein the further radar packets contain only a SYNC field.

11. The receiver of claim 1, further comprising an interface unit for receiving a wired signal or a wireless signal, wherein the synchronization unit is operatively coupled to the interface unit and further configured to time a reception of the synchronization signal based on the wired signal or the wireless signal.

12. The receiver of claim 1, wherein the synchronization unit is configured to estimate the carrier frequency offset, derive the reference time and derive the time window in a periodical manner.

13. A radar system comprising:

a transmitter that includes a first ultra-wideband, UWB, communication unit configured to operate in a radar mode and to transmit a synchronization signal; and a receiver that includes a second UWB communication unit configured to operate in the radar mode and to receive the synchronization signal transmitted by the transmitter, and a synchronization unit operatively coupled to the second UWB communication unit, wherein the synchronization unit is configured to estimate a carrier frequency offset from the synchronization signal, derive a reference time from the synchronization signal, and derive a time window for the reception of a radar packet by the second UWB communication unit, wherein the time window is derived from the estimated carrier frequency offset and the reference time.

14. The radar system of claim 13, wherein the transmitter further comprises an interface unit for receiving a wired signal or a wireless signal, and wherein the transmitter is configured to time the transmission of a radar block based on the wired signal or the wireless signal.

15. A method of operating a receiver, comprising:

receiving, by an ultra-wideband, UWB, communication unit included in a receiver, a synchronization signal transmitted by a transmitter;

estimating, by a synchronization unit included in the receiver, a carrier frequency offset from the synchronization signal;

deriving, by the synchronization unit, a reference time from the synchronization signal;

deriving, by the synchronization unit, a time window for the reception of a radar packet by the UWB communication unit, wherein the time window is derived from the estimated carrier frequency offset and the reference time.

16. The method of claim 15, wherein the synchronization unit estimates the carrier frequency offset using data in a SYNC field included in the synchronization signal.

17. The method of claim 15, wherein the synchronization unit derives the reference time from a start-of-frame delimiter, SFD, field included in the synchronization signal.

18. The method of claim 15, wherein the synchronization unit derives the reference time from an output of one or more ranging operations performed between the UWB communication unit and the transmitter.

19. The method of claim 15, wherein the time window is defined by a number of clock increments, and wherein the synchronization unit is configured to correct the number of clock increments using the estimated carrier frequency offset.

20. The method of claim 19, wherein the synchronization unit corrects the number of clock increments by adding an amount c to the number of clock increments, wherein the amount c is calculated as follows:

$$c = CFO \cdot \frac{T}{f_c},$$

wherein CFO represents the estimated carrier frequency offset, T represents a jointly defined time window in clock increments, and $f_c$ represents the carrier frequency.

* * * * *